US012488081B2

(12) United States Patent
Speranza

(10) Patent No.: US 12,488,081 B2
(45) Date of Patent: Dec. 2, 2025

(54) COMMUNICATING CREDENTIALS BETWEEN TWO OPERATING SYSTEMS

(71) Applicant: BlackBerry Limited, Waterloo (CA)

(72) Inventor: Roberto Speranza, Woodbridge (CA)

(73) Assignee: BlackBerry Limited, Waterloo (CA)

( * ) Notice: Subject to any disclaimer, the term of this patent is extended or adjusted under 35 U.S.C. 154(b) by 140 days.

(21) Appl. No.: 18/494,504

(22) Filed: Oct. 25, 2023

(65) Prior Publication Data

US 2025/0139217 A1 May 1, 2025

(51) Int. Cl.
*G06F 21/33* (2013.01)
*G06F 21/44* (2013.01)
*G06F 21/60* (2013.01)
*H04L 9/08* (2006.01)
*H04L 9/14* (2006.01)
*H04L 9/32* (2006.01)
*H04L 9/40* (2022.01)

(52) U.S. Cl.
CPC .................................... *G06F 21/33* (2013.01)

(58) Field of Classification Search
CPC . G06F 21/33; G06F 21/44; H04L 9/14; H04L 9/0822; H04L 9/0869; H04L 9/3239; H04L 9/3268
See application file for complete search history.

(56) References Cited

U.S. PATENT DOCUMENTS 7,702,906 B1 * 4/2010 Karr ........................ H04L 67/10 713/164
10,691,837 B1 * 6/2020 Martel .................. H04L 9/0863
2005/0097362 A1 * 5/2005 Winget ............... H04L 63/0823 726/4
2010/0153749 A1 * 6/2010 Sakai .................. G06F 21/6236 710/22
2019/0065747 A1 * 2/2019 Gomes de Oliveira ..................... H04L 9/0643
2019/0102555 A1 * 4/2019 Novak .................. H04L 9/3268
2019/0123905 A1 * 4/2019 Kirner ...................... H04L 63/06
2021/0119800 A1 * 4/2021 Jung ..................... H04L 9/3242
2023/0098097 A1 3/2023 Vaid et al.
2023/0130256 A1 * 4/2023 Savage ................. H04L 9/0894 713/156
2023/0177146 A1 6/2023 Dastidar et al.

FOREIGN PATENT DOCUMENTS

WO WO 2009044461 4/2009
WO WO 2023107233 6/2023

OTHER PUBLICATIONS

Extended European Search Report in European Appln. No. 24208822.7, mailed on Apr. 3, 2025, 8 pages.
Menezes et al., "Chapter 12: Key Establishment Protocols Ed" Handbook of applied cryptography, CRC press, Oct. 1996, 489-541.
Office Action in Japanese Appln. No. 2024-160678, mailed on Sep. 10, 2025, 5 pages (with English machine translation).

* cited by examiner

*Primary Examiner* — Darren B Schwartz
(74) *Attorney, Agent, or Firm* — Fish & Richardson P.C.

(57) ABSTRACT

Systems, methods, and software can be used to provide credentials for a provisioning operation. In some aspects, a method includes: generating, by a first operating system (OS), a first transfer key; sending, from the first OS to a second OS, a random salt by using the first transfer key; generating, by the first OS, a second transfer key by using the random salt; and sending, from the first OS to the second OS, provisioning credentials by using the second transfer key.

20 Claims, 5 Drawing Sheets

COMMUNICATING CREDENTIALS BETWEEN TWO OPERATING SYSTEMS

TECHNICAL FIELD

The present disclosure relates to communicating credentials between two operating systems (OSs).

BACKGROUND

In some implementations, credentials may be communicated between two OSs. For example, during a provisioning operation, one OS may send provisioning credentials to another OS.

DETAILED DESCRIPTION

In some cases, two operating systems (OSs) may run on the same device. The device can be a stand-alone device or a module in a system. In a provisioning operation, a primary OS may trigger the provisioning operation on a secondary OS. The primary OS may set up a device specific certificate authority (CA) for the device, and send the CA certificate and CA keys (e.g., CA private key) to the secondary OS. In some implementations, the provisioning process may take place during the manufacturing stage, and both OSs store the provisioning credentials when the device is manufactured. However, in some cases, these provisioning credentials may be deleted in an initialization process, e.g., a factory reset operation. Therefore, a runtime provisioning operation can be used to regenerate and populate the provisioning credentials in both OSs to ensure that both OSs can communicate with each other using mutual Transport Layer Security (mTLS).

In some cases, to provide the shared secret, e.g., provisioning credentials, to the secondary OS in a secure way, the primary OS can generate a first transfer key and a random salt. The primary OS can send the random salt wrapped by the first transfer key to the secondary OS. The secondary OS can obtain the random salt using an unwrap operation. The secondary OS can send the random salt back to the first OS to confirm the receipt of the random salt. In some cases, the secondary OS sends the size of the random salt back to the first OS to acknowledge the receipt. In some cases, the secondary OS performs a hashing operation on the random salt and send the hashed random salt back to the first OS. Both the primary OS and the secondary OS can generate a second transfer key using the random salt, and communicate provisioning credentials by using the second transfer key. In some cases, an encoding algorithm can be used to protect the transmission of the random salt between the primary OS and the secondary OS. These approaches increase the security of the provisioning operations. FIGS. 1-5 and associated descriptions provide additional details of these implementations.

Figure 1:
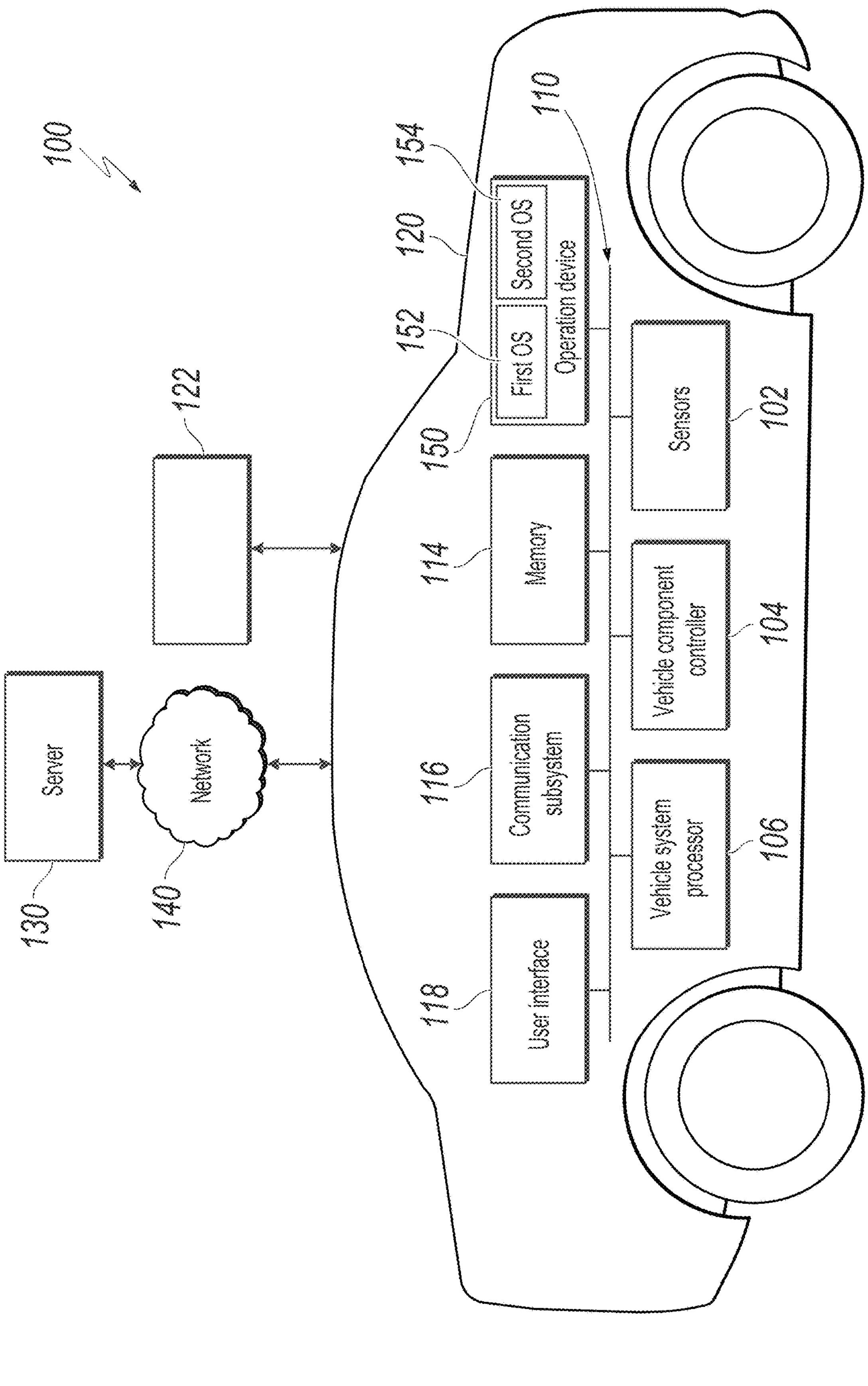
FIG. 1 is a schematic diagram showing an example system that provides a provisioning operation, according to an implementation.

FIG. 1 is a schematic diagram showing an example communication system 100 that provides a provisioning operation, according to an implementation. At a high level, the example communication system 100 includes a vehicle 120 that is communicatively coupled with a client device 122. The vehicle 120 is also communicatively coupled with a server 130 over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicle system processor 106, a communication subsystem 116, a user interface 118, memory 114, and an operation device 150, that are connected to a bus 110.

In some cases, a vehicle can include one or more sensors. The one or more sensors can generate inputs, e.g., video or audio inputs, that reflect the surroundings or the environment inside of the vehicle. Examples of the sensors can include cameras, microphones, laser, radar, ultrasonic, light detection and ranging (LIDAR) or any other sensors.

The vehicle 120 includes one or more sensors 102 that detect or measure information for the vehicle 120. Examples of the sensors 102 can include sensors that capture environmental information that is external to the vehicle 120, such as cameras, microphones, laser, radar, ultrasonic, light detection and ranging (LIDAR), and the like. These sensors can provide environmental inputs for an automatic processing platform operating on the vehicle 120 to make automatic decisions. Examples of the sensors 102 can also include devices that capture information that is internal to the vehicle 120, such as monitors for components such as engine, battery, fuel, electronic system, cooling systems, and the like. These sensors can provide operation status and warnings to the automatic processing platform operating on the vehicle 120. Examples of the sensors 102 can also include acoustic sensors that can detect the sound level inside the vehicle 120. The acoustic sensors can determine the noise level inside the vehicle 120 or provide input to other signal processors that determine the noise level.

The vehicle 120 includes a vehicle component controller 104. Although illustrated as a vehicle component controller 104 in FIG. 1, the vehicle 120 can include two or more vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, entertainment system, and any other components of the vehicle 120. For example, the vehicle component controller 104 can control the speaker system of the vehicle 120, including controlling the volume, balance, fade, and any other settings for audio output inside the vehicle 120. The vehicle component controller 104 can operate a respective component automatically, according to input from the vehicular system processor 106, or a combination thereof. In some implementations, the vehicle component controller 104 can include a data processing apparatus.

The vehicle system processor 106 can include one or more processing components (alternatively referred to as "processors" or "central processing units" (CPUs)) configured to execute instructions related to one or more of the processes, steps, or actions for the automatic processing platform operating on the vehicle 120. Generally, the vehicle system processor 106 executes instructions and manipulates data to perform the operations of the automatic processing platform. The vehicle system processor 106 can receive inputs from the sensors 102 and generate commands to the vehicle component controller 104. In some cases, the vehicle system processor 106 can perform automatic operations. In some cases, the vehicle system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include an I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

The operation device 150 represents an application, a set of applications, software, software modules, hardware, or any combination thereof that can be configured to preform one or more specific operations of the vehicle 120. In some implementations, the operation device 150 can be a module that controls infotainment operation of the vehicle 120. For example, the operation device 150 can interact with the sensors 102 to obtain data and present on the user interface 118, the operation device 150 can also receive user input from the user interface 118, and control speakers or screens to output videos or music.

In some implementations, both a first OS 152 and a second OS 154 can run on the operation device 150. The first OS 152 can also be referred to as a primary OS. The first OS 152 can be configured to interact with a control component of the vehicle 120 related to the driving operation of the vehicle 120, e.g., some of sensors 102 (e.g., LIDAR), vehicle system processor 106, vehicle component controller 104, involved in automatic processing platform. The second OS 154 can also be referred to as a secondary OS. The second OS 154 can be configured to interact with the user interface 118, the communication subsystem 116, and outside devices such as the client device 122 and the server 130. In one example, the first OS 152 can be a real-time embedded OS. The second OS 154 can be an ANDROID or IOS. In some implementations, the first OS 152 does not have access to components outside of the vehicle 120, while the second OS 154 can interact with devices outside of the vehicle 120 through the communication subsystem 116.

Figure 2:
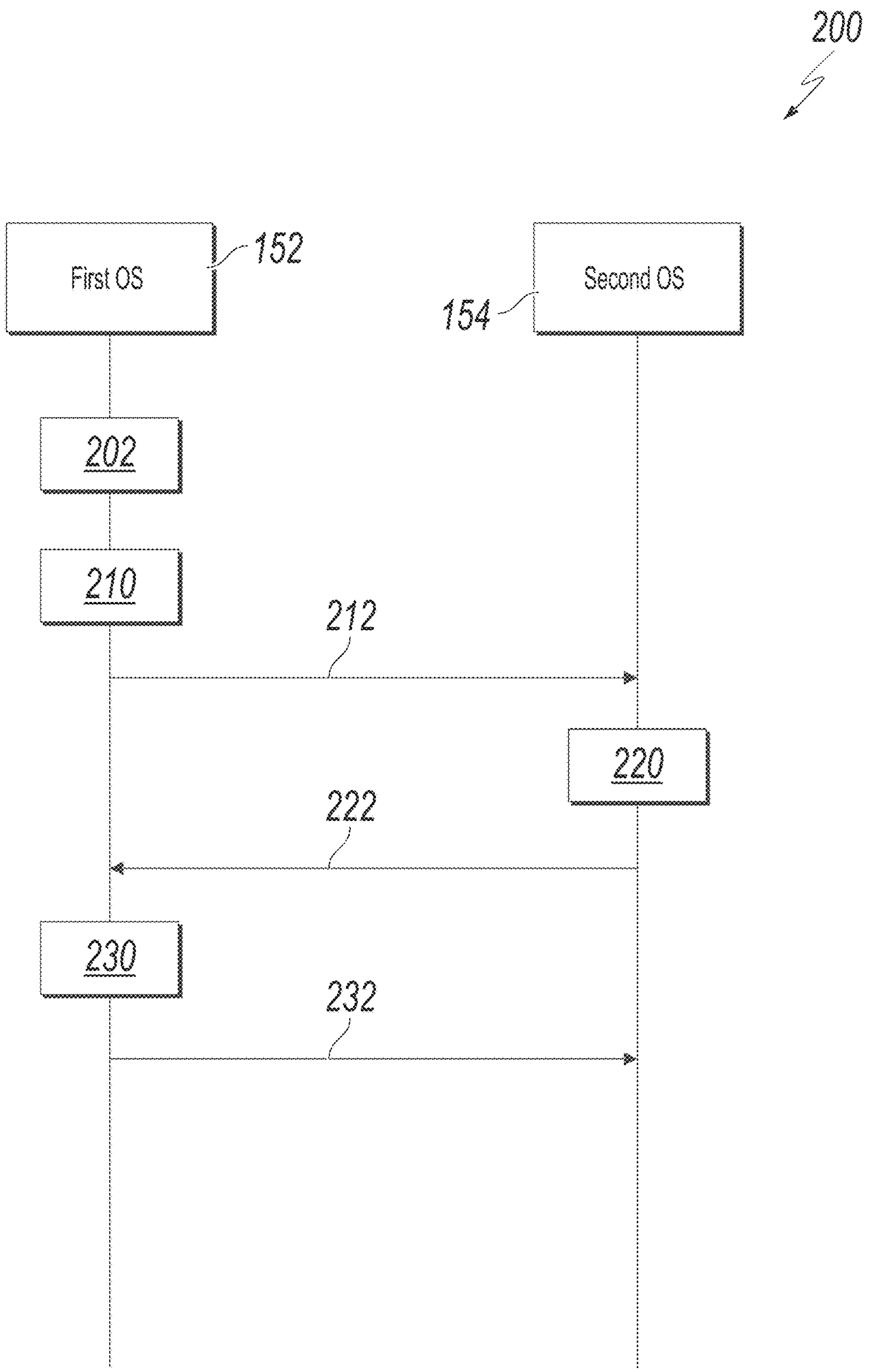
FIG. 2 is a flow diagram showing an example process of a provisioning operation, according to an implementation.
Figure 3:
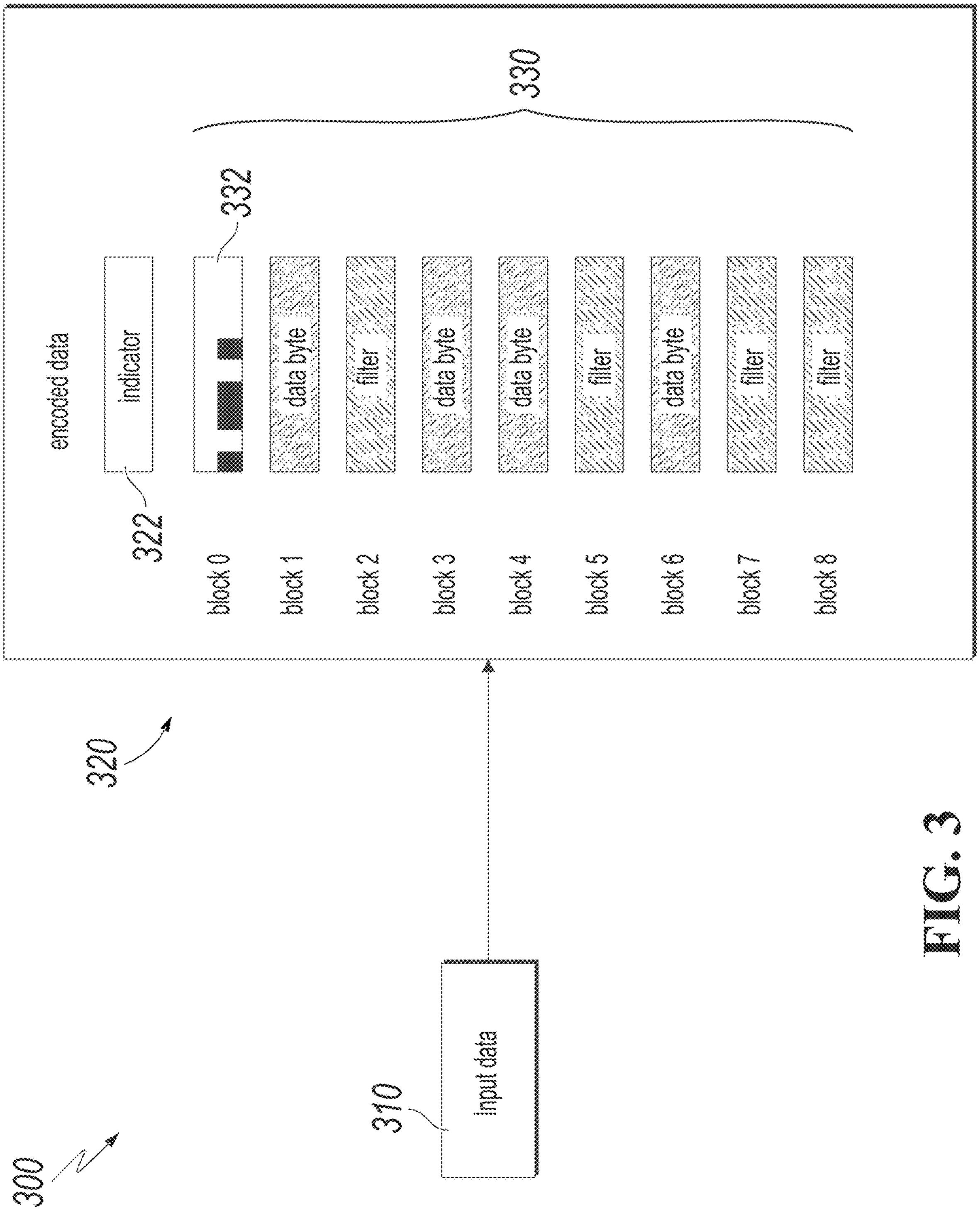
FIG. 3 is an illustration showing an example encoding scheme, according to an implementation.
Figure 4:
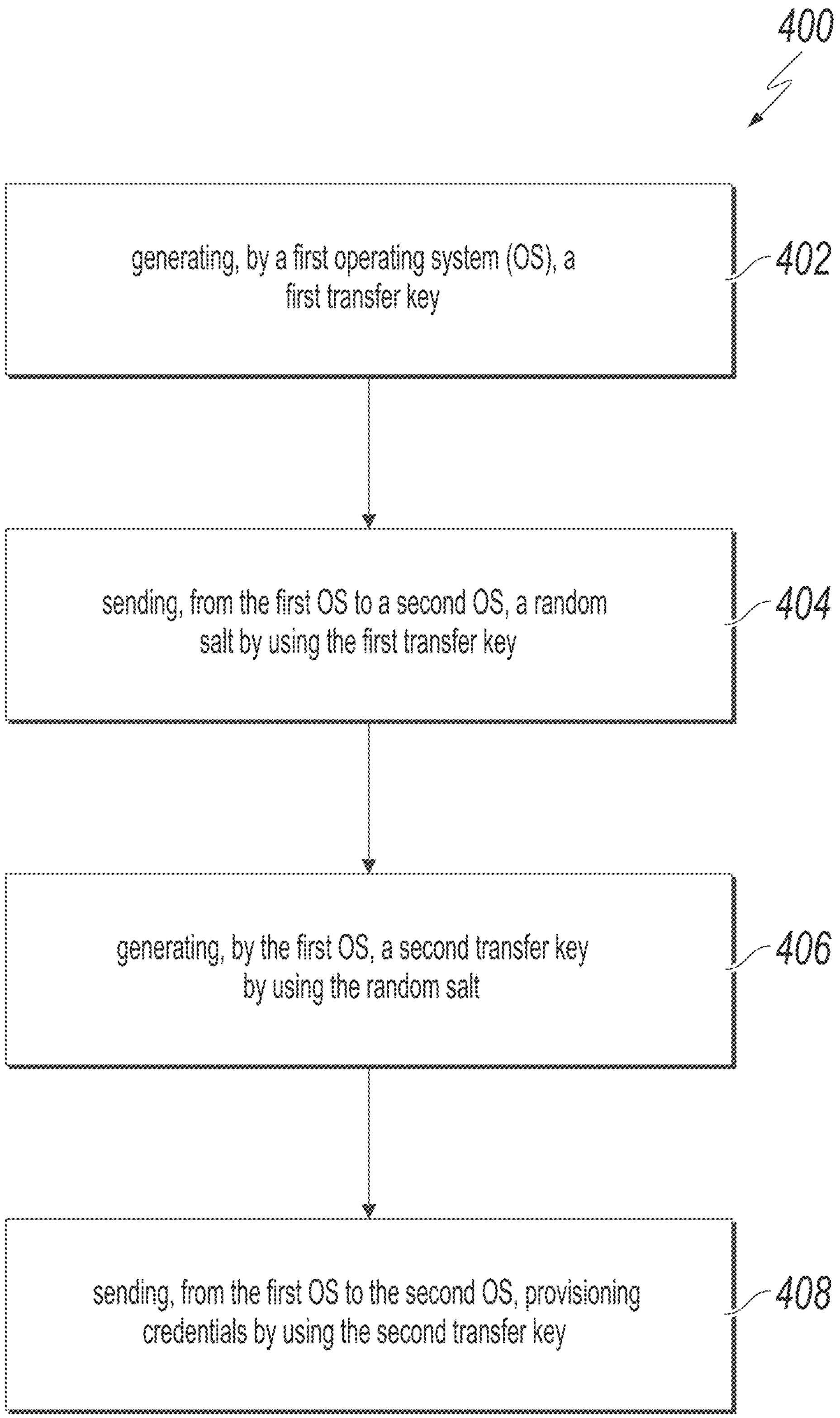
FIG. 4 is a flowchart showing an example method of a provisioning operation, according to an implementation.

In one example operation, a turn-on of the vehicle 120, e.g., by an engine starting operation, can trigger the power up of the operation device 150. When the operation device 150 is powered up, the first OS 152 is started first to begin runtime operation. The first OS 152 then initiates the start of the second OS 154. The first OS 152 can check whether a provisioning operation is needed. The provisioning operation may be needed because no provisioning operation has been performed before or a re-provisioning operation is needed. The first OS 152 establishes a mutual Transport Layer Security (mTLS) relationship with the second OS 154 by communicating a shared secret. In some implementations, the first OS 152 can initiate the provisioning process by sending a runtime generated random salt wrapped with a first transfer key to the second OS 154. The random salt can be used to generate a second transfer key that is used to transmit provisioning credentials. FIGS. 2-4 and associated descriptions provide additional details of these implementations. In some implementations, a module or an app within the first OS 152 can be configured to perform some or all of these provisioning operations.

As illustrated, the bus 110 provides a communication interface for components of the automatic processing platform operating on the vehicle 120. In some cases, the bus 110 can be implemented using a Controller Area Network (CAN) bus.

The client device 122 represents an application, a set of applications, software, software modules, hardware, or any combination thereof that interact with the vehicle 120. For example, the client device 122 can interact with the operation device 150 for infotainment operations. The client device 122 can be an electronic device that may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless or wired communication network. The electronic device can also be a peripheral device, such as a headset, a remote controller, or a display. The electronic device can connect with the vehicle 120 using short-range communication technology. The short-range communication technology can be wireless, such as BT, NFC, WLAN. The short-range communication technology can also be wired, such as USB.

The server 130 represents an application, a set of applications, software, software modules, hardware, or any combination thereof that can be configured to manage operations of the vehicle 120. In some implementations, the server 130 can interact with the operation device 150 for security or infotainment operations.

The example communication system 100 includes the network 140. The network 140 represents an application, set of applications, software, software modules, hardware, or a combination thereof, that can be configured to transmit data between the server 130 and the vehicle 120 in the communication system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

Furthermore, while the processes and methods in this disclosure are described using the vehicle 120 in FIG. 1 as an example, these processes and methods can also be used in other non-vehicle devices, where two OSs are operating on the same device and communicate shared secrets in a provisioning process. Furthermore, the processes and methods can be used in between two OSs on different devices to communicate shared secrets in a provisioning process.

FIG. 2 is a flow diagram showing an example process 200 of a provisioning operation, according to an implementation. The process 200 can be implemented by one or more entities shown in FIG. 1, or any other systems or modules that provide provisioning operation. For example, the process 200 can be implemented by the first OS 152 and the first OS 154 illustrated in FIG. 2. The example process 200, shown in FIG. 2, can be implemented using additional, fewer, or different operations, which can be performed in the order shown or in a different order.

The example process 200 begins at step 202, where the provisioning process is triggered. In some implementations, the process 200 can be triggered by a start of the first OS 152. When the first OS 152 starts, the first OS 152 can check the provisioning storage to determine if some or all of the provisioning credentials are stored. As will be discussed in step 232 later, the provisioning credentials can include entity keys, CA keys, entity certificates, or CA certificates or any combinations thereof. In some implementations, these provisioning credentials are stored at a particular storage so that they are accessible to the second OS 154. If the provisioning credentials are stored, the first OS 152 proceeds to check whether these provisioning credentials are valid. The first OS 152 can determine whether these provisioning credentials are valid by attempting a crypto operation using the provisioning credentials. Examples of the crypto operation include an encryption operation or a decryption operation. The encryption operation or the decryption operation can be based on Advanced Encryption Standard If the crypto operation is successfully set up to proceed to the next step, then the provisioning credentials are valid.

If the provisioning credentials are not stored or not valid, the first OS 152 proceeds to step 210 to start the provisioning process.

In some implementations, the second OS 154 can determine whether a provisioning process is needed by checking whether provisioning credentials are available. In some implementations, the provisioning credentials are stored at a keystore that is accessible to the second OS 154. The second OS 154 can check the keystore to determine whether the provisioning credentials are available. If the provisioning credentials are available, the second OS 154 can proceed to operate. If the provisioning credentials are not available, the second OS 154 will wait to receive the provisioning credentials.

In the illustrated example, the provisioning process is initiated by the first OS 152. Alternatively or in combination, the second OS 154 can also start the provisioning process. For example, if the second OS 154 determines that the provisioning credentials are not present, the second OS 154 can send a provisioning request to the first OS 152 to trigger the step 210.

At step 210, the first OS 152 generates a first transfer key. In some implementations, the first transfer key can be generated based on a passphrase and a first salt. The passphrase is a secret that is shared between the first OS 152 and the second OS 154. An example of the passphrase can be a password. The first salt is a fixed value that is accessible to both the first OS 152 and the second OS 154. Example of the first salt value can be a random or a pseudorandom value. In some cases, the first salt can be generated by a manufacturer of the device that runs the first OS 152 and the second OS 154. The first salt can be stored on the device that both the first OS 152 and the second OS 154 can access. In some cases, the first salt can be the same for multiple devices manufactured by the same manufacturer.

The first transfer key can be generated by using a key derivation function or a key generating API with the passphrase and the first salt as input. Examples of the key derivation function or a key generating API include OpenSSL API or EnVeloPe key derivation function (EVP KDF).

In some cases, the first transfer key can be further processed by using a hashing function. For example, a Secure Hash Algorithm 256-bit (SHA256) algorithm can be applied on the first transfer key to extend the first transfer key to 256 bits. Other hashing functions can also be used.

The first OS 152 also generates a random salt at step 210. The random salt can be generated by using a pseudorandom number generator. Because the random salt is generated at each runtime when the process 200 is performed, thus unlike the first salt discussed previously, the random salt is different for each device and different each time the provisioning process takes place.

At 212, the first OS 152 sends the random salt that is wrapped with the first transfer key to the second OS 154. The first OS 152 performs the wrapping operation by using the first transfer key to generate cipher text from the random salt input, and the cipher text is then sent to the second OS 154.

In some cases, the data communications between the first OS 152 and the second OS 154 can be implemented by using memory transfer protocols such as Hypervisor ABstraction (HAB). Alternatively or in combination, the data communications between the first OS 152 and the second OS 154 can be implemented by other standardized communication protocols, e.g., Transmission Control Protocol (TCP), or proprietary communication protocols.

At 220, the second OS 154 receives the wrapped random salt, and performs an unwrapping function to obtain the random salt. As discussed previously, the second OS 154 has access to the same passphrase and first salt that the first OS 152 used to generate the first transfer key. Therefore, the second OS 154 can also use the passphrase and first salt to generate the first transfer key, and can use the first transfer key to unwrap the received wrapped random salt to obtain the random salt.

At 222, the second OS 154 sends a first response to the first OS 152. The first response includes the random salt that is decoded from the step 220. By sending the decoded random salt back to the first OS 152, the second OS 154 indicates to the first OS 152 that the random salt has been successfully received and decoded. Alternatively or additionally, the second OS 154 can send the size of the random salt to the first OS 152 to acknowledge the receipt of the random salt.

In some implementations, before sending the random salt at 222, the second OS 154 can process the random salt by using a hashing function. For example, a Secure Hash Algorithm 256-bit (SHA256) algorithm can be applied on the random salt to extend the random salt to 256 bits. Other hashing functions can also be used. Sending the hashed random salt can improve the security protection of the information that is transmitted.

In some cases, to further improve the security of the transmission between the first OS 152 and the second OS 154, an encoding scheme can be applied to the data that is transmitted at step 212, step 222, or both. FIG. 3 is an illustration showing an example encoding scheme 300, according to an implementation.

As shown in FIG. 3, the input data 310 is encoded to generate the encoded data 320. The encoded data is organized in one or more block groups. Each block group, e.g., the block group 330, includes a zeroth block 332. The zeroth block 332 is a bitmask that indicates whether each of the remaining blocks in the block group 330 is a data block or a filler block. In the illustrated example, the bitmask includes 8 bits, the first, third, fourth, and sixth bit are set to “1”, which indicates that the corresponding blocks, i.e., blocks 1, 3, 4, and 6 are data blocks. The rest of the blocks are filler blocks. The input data 310 can fill the data block in sequences, starting from block 1, then proceeding to block 3, 4, and 6, which skips the filler blocks. The filler blocks can be filled with “1”, “0”, or randomly generated bits. If there are additional data in the input data 310 after filling the data blocks in the block group 330, a second block group can be included. The second block group also starts with a bitmask block to indicate whether each of the remaining blocks in the second block group is a data block or a filler block. This process can repeat until all the input data 310 are included in the encoded data 320. In the illustrated example, each bitmask has 8 bits and each block group has 9 blocks (8 blocks corresponding to each bit in the bitmask, plus the bitmask block), and each block can be a byte. The size of the block, and the size of the block group can also be other numbers.

In some cases, the bitmasks can be generated by using a random function. The bitmasks in each block group can be the same or different.

In some implementations, the encoded data 320 can also include an indicator 322. The indicator 322 can indicate a sequential order. For example, a bit in the indicator 322 can be set to “0” to indicate a normal order, and to “1” to indicate a reverse order. Alternatively, the indicator 322 can be a byte that is set to “0” to indicate a normal order, and to “255” to indicate a reverse order. In some implementations, a normal order can indicate that the data are filled from the first data block to the last data block in each block group, while a reverse order can indicate that the data are filled from the last data block to the first data block in each block group. Alternatively or additionally, a normal order can indicate that the data are filled from the first block group to the last block group, while a reverse order can indicate that the data are filled from the last block group to the first block group. Alternatively or additionally, a normal order can indicate that the indication bits in the bitmask are in sequence, where the first bit corresponds to the first block after the bitmask, and a reverse order can indicate that the indication bits in the bitmask are in reverse sequence, where the first bit corresponds to the last block in the block group. Alternatively or additionally, a normal order can indicate that the indication bits in the bitmask are set to “1” to represent data block and “0” to represent filler block, and a reverse order can indicate that that the indication bits in the bitmask are set to “0” to represent data block and “1” to represent filler block. In some cases, the indicator 322 can include multiple bits to indicate orders of different types discussed previously. For example, one bit can indicate the order within the block group, another bit can indicate the order among the block groups, yet one or two bits can indicate the order of bitmasks discussed previously. In some implementations, the indictor 322, or each bit in the indicator 322, can be generated randomly.

The encoded scheme in FIG. 3 can be used in step 212, where the wrapped random salt is encoded by using this encoded scheme. A data length indicator can also be transmitted in step 212 to indicate the size of the input data before encoding. The second OS 154 will first decode the data to obtain the wrapped random salt according to the indicator 322 and the first block 332 in each block group. The second OS 154 then further decodes the wrapped random salt by unwrapping with the first transfer key to obtain the random salt.

Additionally or alternatively, the encoded scheme in FIG. 3 can be used in step 222 to transmit the first response that includes the random salt. A data length indicator can also be transmitted in step 222 to indicate the size of the input data before encoding.

Returning to FIG. 2, at step 230, the first OS 152 receives the first response, and determines whether the data in the first response matches the random salt. If the first response is encoded using the encoded scheme in FIG. 3, the first OS 152 uses the indicator 322 and the zeroth block 332 in each block group to obtain the data in the first response. In some cases, as discussed previously, the data in the first response can be a hashed random salt. In this case, the first OS 152 can also perform a hash with the same hashing function on the random salt, and compare the hash result with the data in the first response. If the hash result matches the data in the first response, then the first OS 152 can conclude that the second OS 154 has successfully obtained the random salt that was sent at the step 212. Alternatively, the data in the first response can include the random salt without a hashing operation. In this case, the first OS 152 can just compare the data with the random salt to determine whether the second OS 154 has successfully obtained the random salt.

If the match is not successful, the first OS 152 can go back to step 210 and generate another random salt and repeat steps 212 to 222.

If the match is successful, then both the first OS 152 and the second OS 154 can use this random salt to generate a second transfer key. In some implementations, the second transfer key can be generated by using a key derivation function or a key generating API with the passphrase (used in step 210 to generate the first transfer key) and the random salt as input. Examples of the key derivation function or a key generating API include OpenSSL API or EVP KDF. The second transfer key can be used to wrap the provisioning credentials to send by the first OS 152.

The first OS 152 can generate the provisioning credentials in response to finding the successful match at step 230. Alternatively or in combination, the first OS 152 can generate some or all of the provisioning credentials before the successful match at step 230, e.g., during step 210 or after step 212.

The provisioning credentials can include one or more of the following: the device CA private key, the device CA public key, the device CA certificate, the entity private key, the entity public key, the entity certificate, the key encryption key that is used to wrap private keys, and other credentials.

At step 232, the first OS 152 sends the provisioning credentials to the second OS 154. The provisioning credentials are wrapped with the second transfer key. The first OS 152 performs the wrapping operation by using the second transfer key to generate cipher text from the provisioning credentials, and the cipher text is then sent to the second OS 154. The second OS 154 obtains the provisioning credentials by using an unwrap operation to unwrap the received cipher text with the second transfer key.

In some cases, the types of provisioning credentials generated and the types of provisioning credentials that are transmitted depend on the particular security operations associated with the provisioning process. In one implementation, a device CA is provisioned by the first OS 152. The first OS 152 can send the CA private key and the CA certificate to the second OS 154, in one transmission or in separate transmissions. The second OS 154 can instantiate the CA based on the received CA private key and CA certificate and use it to generate an entity certificate for an entity, e.g., the operating device 150. In some cases, each end point of a connection can be referred to as an entity.

In another implementation, entity keypairs can be created in first OS 152 and second OS 154. In this case, the first OS 152 sends the entity certificate to the second OS 154. In yet another implementation, a third party CA certificate is transmitted between the first OS 152 and second OS 154 or vice versa, depending on which OS has access to the Internet, and which one does not have Internet access.

FIG. 4 is a flowchart showing an example method 400 of a provisioning operation, according to an implementation. The method 400 can be implemented by one or more entities shown in FIG. 1, or any other systems or modules that provide provisioning operations. For example, the method 400 can be implemented by the operation device 150 illustrated in FIG. 1. The example method 400, shown in FIG. 4, can be implemented using additional, fewer, or different operations, which can be performed in the order shown or in a different order.

At 402, the first OS generates a first transfer key. In some cases, the first OS generates the first transfer key by deriving the first transfer key from a passphrase and a first salt value. At 404, the first OS sends a random salt to a second OS by using the first transfer key. At 406, the first OS generates a second transfer key by using the random salt. In some cases, the first OS generates the second transfer key from the passphrase and the random salt. At 408, the first OS sends provisioning credentials to the second OS by using the second transfer key.

Figure 5:
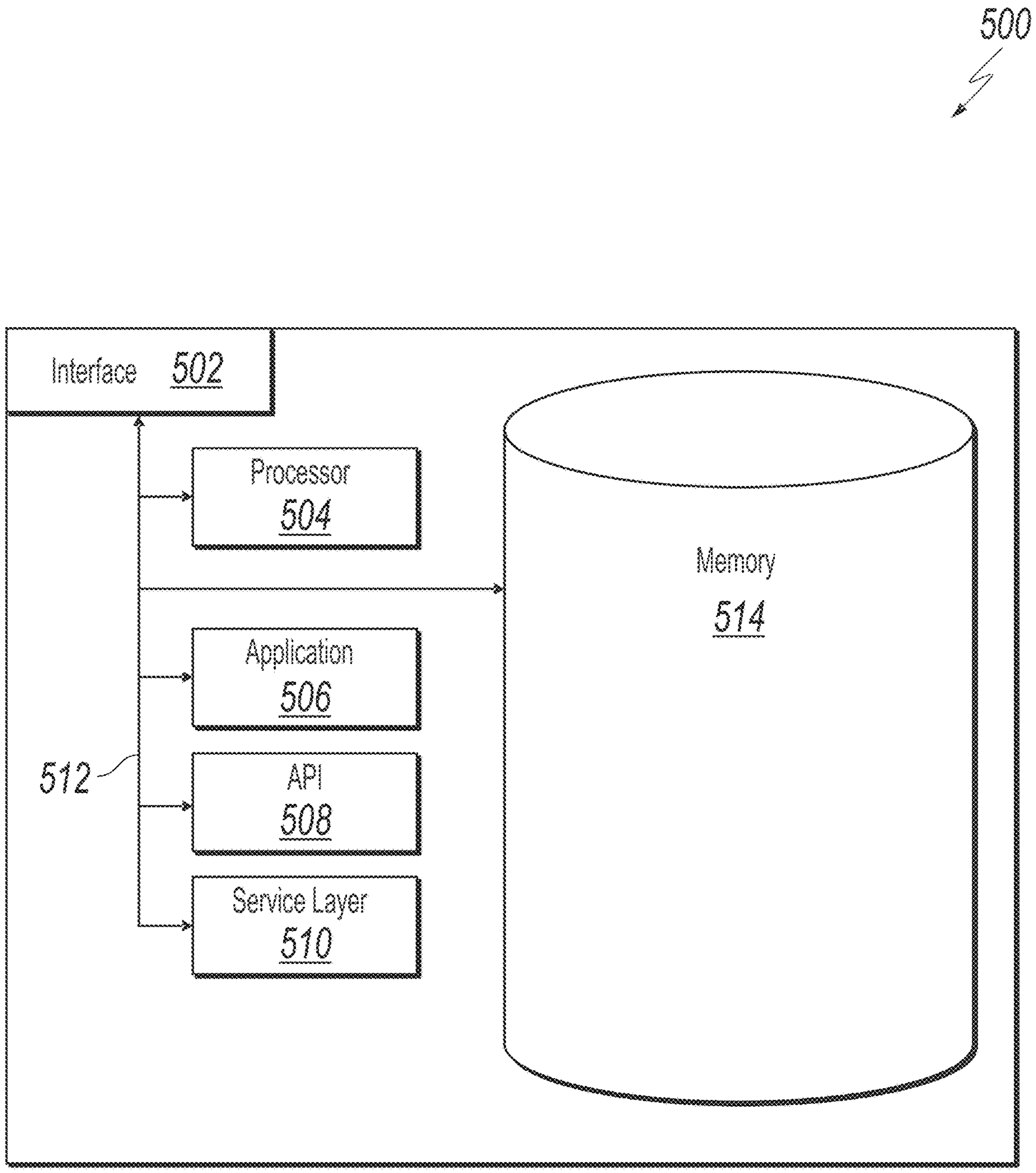
FIG. 5 illustrates a high-level architecture block diagram of a computer according to an implementation Like reference numbers and designations in the various drawings indicate like elements.

FIG. 5 illustrates a high-level architecture block diagram of a computer 500 according to an implementation. The computer 500 can be implemented as the operation device 150, the client device 122, the server 130, or any combinations thereof. The computer 500 can also be used to implement the operations discussed in FIGS. 1-4. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the processing algorithm of the code package establishment can be implemented in an executable computing code, e.g., C/C++ executable codes. In some cases, the computer 500 can include a standalone Linux system that runs batch applications. In some cases, the computer 500 can include mobile or personal computers.

The computer 500 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 500 can serve as a client, network component, a server, a database or other persistency, and/or any other components. In some implementations, one or more components of the computer 500 may be configured to operate within a cloud-computing-based environment.

At a high level, the computer 500 is an electronic computing device operable to receive, transmit, process, store, or manage data. According to some implementations, the computer 500 can also include or be communicably coupled with an application server, e-mail server, web server, caching server, streaming data server, business intelligence (BI) server, and/or other server.

The computer 500 can collect data of network events or mobile application usage events over network 110 from a web browser or a client application, e.g., an installed plugin. In addition, data can be collected by the computer 500 from internal users (e.g., from a command console or by another appropriate access method), external or third parties, other automated applications, as well as any other appropriate entities, individuals, systems, or computers.

Each of the components of the computer 500 can communicate using a system bus 512. In some implementations, any and/or all the components of the computer 500, both hardware and/or software, may interface with each other and/or the interface 502 over the system bus 512 using an Application Programming Interface (API) 508 and/or a service layer 510. The API 508 may include specifications for routines, data structures, and object classes. The API 508 may be either computer language-independent or -dependent and refer to a complete interface, a single function, or even a set of APIs. The service layer 510 provides software services to the computer 500. The functionality of the computer 500 may be accessible for all service consumers using this service layer. Software services, such as those provided by the service layer 510, provide reusable, defined business functionalities through a defined interface. For example, the interface may be software written in JAVA, C++, or other suitable languages providing data in Extensible Markup Language (XML) format or other suitable format. While illustrated as an integrated component of the computer 500, alternative implementations may illustrate the API 508 and/or the service layer 510 as stand-alone components in relation to other components of the computer 500. Moreover, any or all parts of the API 508 and/or the service layer 510 may be implemented as child or sub-modules of another software module, enterprise application, or hardware module without departing from the scope of this disclosure.

The computer 500 includes an interface 502. Although illustrated as a single interface 502 in FIG. 5, two or more interfaces 502 may be used according to particular needs, desires, or particular implementations of the computer 500. The interface 502 is used by the computer 500 for communicating with other systems in a distributed environment connected to a network (whether illustrated or not). Generally, the interface 502 comprises logic encoded in software and/or hardware in a suitable combination and operable to communicate with the network. More specifically, the interface 502 may comprise software supporting one or more communication protocols associated with communications such that the network or interface's hardware is operable to communicate physical signals within and outside of the computer 500.

The computer 500 includes at least one processor 504. Although illustrated as a single processor 504 in FIG. 5, two or more processors may be used according to particular needs, desires, or particular implementations of the computer. Generally, the processor 504 executes instructions and manipulates data to perform the operations of the computer 500. Specifically, the processor 504 executes the functionality disclosed in FIGS. 1-4.

The computer 500 also includes a memory 514 that holds data for the computer 500. Although illustrated as a single memory 514 in FIG. 5, two or more memories may be used according to particular needs, desires, or particular implementations of the computer 500. While memory 514 is illustrated as an integral component of the computer 500, in alternative implementations, memory 514 can be external to the computer 500.

The application 506 is an algorithmic software engine providing functionality according to particular needs, desires, or particular implementations of the computer 500, particularly with respect to functionality required for anomaly detection. Although illustrated as a single application 506, the application 506 may be implemented as multiple applications 506 on the computer 500. In addition, although illustrated as integral to the computer 500, in alternative implementations, the application 506 can be external to the computer 500.

There may be any number of computers 500 associated with, or external to, and communicating over a network. Furthermore, this disclosure contemplates that many users may use one computer 500, or that one user may use multiple computers 500.

Described implementations of the subject matter can include one or more features, alone or in combination.

For example, in a first implementation, a method, comprising: generating, by a first operating system (OS), a first transfer key; sending, from the first OS to a second OS, a random salt by using the first transfer key; generating, by the first OS, a second transfer key by using the random salt; and sending, from the first OS to the second OS, provisioning credentials by using the second transfer key.

The foregoing and other described implementations can each, optionally, include one or more of the following features:

A first feature, combinable with any of the following features, wherein the provisioning credentials comprise at least one of a private key of a certificate authority (CA), or a certificate of the CA.

A second feature, combinable with any of the previous or following features, further including receiving, by the first OS, a first response from the second OS, wherein the first response comprises data; and determining, by the first OS, that the data in the first response matches the random salt.

A third feature, combinable with any of the previous or following features, wherein the data comprises a bitmask, each bit of the bitmask indicates whether a corresponding byte comprises data or filler.

A fourth feature, combinable with any of the previous or following features, wherein the data comprises an indicator indicating one of a sequential order or a reverse sequential order.

A fifth feature, combinable with any of the previous or following features, wherein whether the data matches the random salt is determined by performing a hashing function on the random salt to generate a hash result, and determining whether the hash result matches the data.

A sixth feature, combinable with any of the previous features, wherein the first OS and the second OS run on a same device, and the first OS and the second OS perform a multiple Transport Layer Security (mTLS) process.

In a second implementation, a computer-readable medium containing instructions which, when executed, cause an electronic device to perform operations comprising: generating, by a first operating system (OS), a first transfer key; sending, from the first OS to a second OS, a random salt by using the first transfer key; generating, by the first OS, a second transfer key by using the random salt; and sending, from the first OS to the second OS, provisioning credentials by using the second transfer key.

The foregoing and other described implementations can each, optionally, include one or more of the following features:

A first feature, combinable with any of the following features, wherein the provisioning credentials comprise at least one of a private key of a certificate authority (CA), or a certificate of the CA.

A second feature, combinable with any of the previous or following features, the operations further including receiving, by the first OS, a first response from the second OS, wherein the first response comprises data; and determining, by the first OS, that the data in the first response matches the random salt.

A third feature, combinable with any of the previous or following features, wherein the data comprises a bitmask, each bit of the bitmask indicates whether a corresponding byte comprises data or filler.

A fourth feature, combinable with any of the previous or following features, wherein the data comprises an indicator indicating one of a sequential order or a reverse sequential order.

A fifth feature, combinable with any of the previous or following features, wherein whether the data matches the random salt is determined by performing a hashing function on the random salt to generate a hash result, and determining whether the hash result matches the data.

A sixth feature, combinable with any of the previous features, wherein the first OS and the second OS run on a same device, and the first OS and the second OS perform a multiple Transport Layer Security (mTLS) process.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: generating, by a first operating system (OS), a first transfer key; sending, from the first OS to a second OS, a random salt by using the first transfer key; generating, by the first OS, a second transfer key by using the random salt; and sending, from the first OS to the second OS, provisioning credentials by using the second transfer key.

The foregoing and other described implementations can each, optionally, include one or more of the following features:

A first feature, combinable with any of the following features, wherein the provisioning credentials comprise at least one of a private key of a certificate authority (CA), or a certificate of the CA.

A second feature, combinable with any of the previous or following features, the operations further including receiving, by the first OS, a first response from the second OS, wherein the first response comprises data; and determining, by the first OS, that the data in the first response matches the random salt.

A third feature, combinable with any of the previous or following features, wherein the data comprises a bitmask, each bit of the bitmask indicates whether a corresponding byte comprises data or filler.

A fourth feature, combinable with any of the previous or following features, wherein the data comprises an indicator indicating one of a sequential order or a reverse sequential order.

A fifth feature, combinable with any of the previous or following features, wherein whether the data matches the random salt is determined by performing a hashing function on the random salt to generate a hash result, and determining whether the hash result matches the data.

A sixth feature, combinable with any of the previous features, wherein the first OS and the second OS run on a same device, and the first OS and the second OS perform a multiple Transport Layer Security (mTLS) process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer readable media for storing computer program instructions and data can include all forms of permanent/non-permanent or volatile/non volatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital versatile/video disc (DVD), compact disc (CD) ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method, comprising:

generating, by a first operating system (OS), a first transfer key;

sending, from the first OS to a second OS, a random salt by using the first transfer key;

generating, by the first OS, a second transfer key by using the random salt;

receiving, by the first OS, a first response from the second OS, wherein the first response comprises data, wherein the data comprises a bitmask, each bit of the bitmask indicates whether a corresponding byte comprises data or filler;

determining, by the first OS, that the data in the first response matches the random salt; and sending, from the first OS to the second OS, provisioning credentials by using the second transfer key.

2. The method of claim 1, wherein the provisioning credentials comprise at least one of a private key of a certificate authority (CA), or a certificate of the CA.

3. The method of claim 1, wherein the data comprises an indicator indicating one of a sequential order or a reverse sequential order.

4. The method of claim 1, wherein whether the data matches the random salt is determined by performing a hashing function on the random salt to generate a hash result, and determining whether the hash result matches the data.

5. The method of claim 1, wherein the first OS and the second OS run on a same device, and the first OS and the second OS perform a multiple Transport Layer Security (mTLS) process.

6. The method of claim 1, wherein the provisioning credentials comprise at least one of an entity private key or an entity public key.

7. The method of claim 1, wherein the provisioning credentials comprise at least one of an entity certificate or an key encryption key.

8. A non-transitory computer-readable medium containing instructions which, when executed, cause an electronic device to perform operations comprising:

generating, by a first operating system (OS), a first transfer key;

sending, from the first OS to a second OS, a random salt by using the first transfer key;

generating, by the first OS, a second transfer key by using the random salt;

receiving, by the first OS, a first response from the second OS, wherein the first response comprises data, wherein the data comprises a bitmask, each bit of the bitmask indicates whether a corresponding byte comprises data or filler;

determining, by the first OS, that the data in the first response matches the random salt; and sending, from the first OS to the second OS, provisioning credentials by using the second transfer key.

9. The computer-readable medium of claim 8, wherein the provisioning credentials comprise at least one of a private key of a certificate authority (CA), or a certificate of the CA.

10. The computer-readable medium of claim 8, wherein the data comprises an indicator indicating one of a sequential order or a reverse sequential order.

11. The computer-readable medium of claim 8, wherein whether the data matches the random salt is determined by performing a hashing function on the random salt to generate a hash result, and determining whether the hash result matches the data.

12. The computer-readable medium of claim 8, wherein the first OS and the second OS run on a same device, and the first OS and the second OS perform a multiple Transport Layer Security (mTLS) process.

13. The computer-readable medium of claim 8, wherein the provisioning credentials comprise at least one of an entity private key or an entity public key.

14. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

generating, by a first operating system (OS), a first transfer key;

sending, from the first OS to a second OS, a random salt by using the first transfer key;

generating, by the first OS, a second transfer key by using the random salt;

receiving, by the first OS, a first response from the second OS, wherein the first response comprises data, wherein the data comprises an indicator indicating one of a sequential order or a reverse sequential order;

determining, by the first OS, that the data in the first response matches the random salt; and sending, from the first OS to the second OS, provisioning credentials by using the second transfer key.

15. The computer-implemented system of claim 14, wherein the provisioning credentials comprise at least one of a private key of a certificate authority (CA), or a certificate of the CA.

16. The computer-implemented system of claim 14, wherein the data comprises a bitmask, each bit of the bitmask indicates whether a corresponding byte comprises data or filler.

17. The computer-implemented system of claim 15, wherein whether the data matches the random salt is determined by performing a hashing function on the random salt to generate a hash result, and determining whether the hash result matches the data.

18. The computer-implemented system of claim 14, wherein the first OS and the second OS run on a same device, and the first OS and the second OS perform a multiple Transport Layer Security (mTLS) process.

19. The computer-implemented system of claim 14, wherein the provisioning credentials comprise at least one of an entity private key or an entity public key.

20. The computer-implemented system of claim 14, wherein the provisioning credentials comprise at least one of an entity certificate or an key encryption key.

* * * * *